D. E. HUNTER.
JOINT CONSTRUCTION.
APPLICATION FILED SEPT. 7, 1909.
960,934.
Patented June 7, 1910.
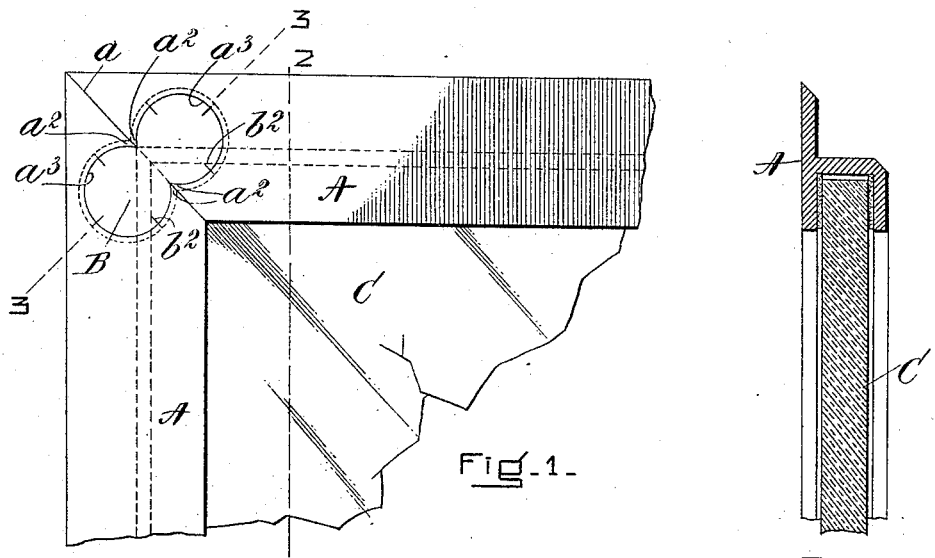
Fig. 1.
Fig. 2.
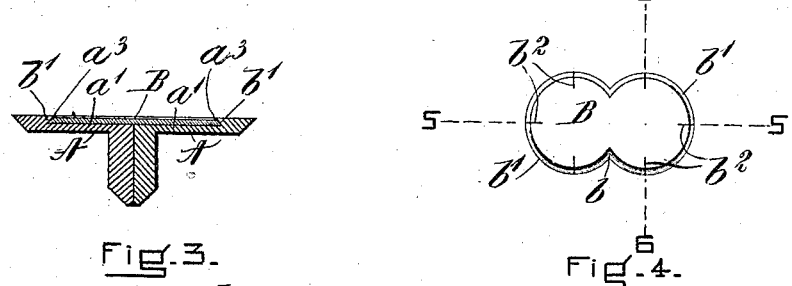
Fig. 3.
Fig. 4.
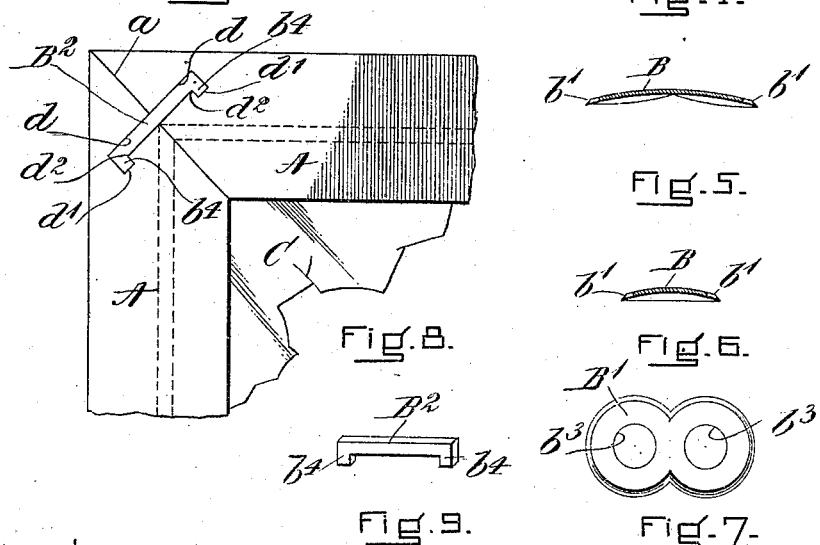
Fig. 8.   Fig. 5.
Fig. 6.
Fig. 9.   Fig. 7.
WITNESSES:
Josephine H. Ryan
Ruby Banfield
INVENTOR:
David E. Hunter
By Roberts, Roberts & Cushman
attorneys.

UNITED STATES PATENT OFFICE.

DAVID E. HUNTER, OF CAMBRIDGE, MASSACHUSETTS, ASSIGNOR TO LIBRARY BUREAU, OF BOSTON, MASSACHUSETTS, A CORPORATION OF NEW JERSEY.

JOINT CONSTRUCTION.

960,934.  Specification of Letters Patent.  Patented June 7, 1910.

Application filed September 7, 1909. Serial No. 516,532.

*To all whom it may concern:*

Be it known that I, DAVID E. HUNTER, a citizen of the United States, and resident of Cambridge, in the county of Middlesex and State of Massachusetts, have invented new and useful Improvements in Joint Construction, of which the following is a specification.

This invention relates to a joint construction and its object is to provide a union for two members having abutting joint-making faces. While it is susceptible of embodiment in many forms and is applicable to a great variety of situations, in the form herein shown for the purpose of illustration it is designed for a corner joint between margin pieces of the panels of cabinets or cases such as museum cases. It is to be understood, however, that the invention is susceptible of much more general application and such general application is contemplated by the claims.

In the accompanying drawings which illustrate certain embodiments of the invention,—Figure 1 is a front elevation of a joint between the margin pieces at the corner of a panel for a cabinet or case; Fig. 2 is a cross sectional view on line 2—2 of Fig. 1 showing the form of margin pieces herein used for the purpose of illustration; Fig. 3 is a cross sectional view on line 3—3 of Fig. 1; Fig. 4 is a plan view of the form of locking dog shown in Fig. 1; Fig. 5 is a sectional view on line 5—5 of Fig. 4; Fig. 6 is a sectional view on line 6—6 of Fig. 4; Fig. 7 is a plan view of a modified form of locking dog; Fig. 8 is a front elevation of the corner of a panel and its margin piece showing a modified form of joint locking means; and Fig. 9 is a perspective view of the locking dog shown in Fig. 8.

A, A represent channel margin pieces, the channels of which engage the edges of the panel piece C, which may be of glass or other suitable material. The margin pieces A are provided with abutting joint-making faces $a$. Each margin piece A is provided with a locking recess which opens through the joint-making faces $a$, the openings of said recesses registering with each other when the two margin members are juxtaposed. In the form shown in Figs. 1 and 3 each locking recess consists of a countersunk area $a'$ in one of the exposed faces of each member A, having enlarged, substantially circular or curvilinear end parts, as shown in Fig. 1, and a constricted throat part opening through the joint-making face $a$, to provide retaining shoulders $a^2$ for the locking dogs. Each recess is also preferably undercut to provide an overhanging lip $a^3$.

B is a locking dog herein shown as consisting of a concavo-convex sheet of soft metal, such as soft steel, having enlarged substantially circular or curvilinear end parts and a constricted middle part $b$, conforming in contour with said juxtaposed recesses in the margin members. The locking dog B extends underneath the lips $a^3$, and is retained in the recess thereby, and for this purpose is preferably provided with a bevel edge $b'$ to fit underneath and engage the overhanging lips $a^3$ of the recesses.

To assemble the parts the two joint-making faces $a$ of the margin members are juxtaposed as shown in Fig. 1, and the concavo-convex locking dog B inserted within the recesses with the convex side outward, and thereafter flattened and consequently expanded into the recesses as best shown in Fig. 3. The flattening and expansion of the locking dog B is facilitated by the marginal notches or slits $b^2$. The two members A, A are thus securely locked together. If it is desired to dismember the parts the locking dog B may be drilled and picked out, the same being readily removable in this manner, as it is held in place by no fastening means save by being expanded within the recesses where it is held by the overhanging lips $a^3$, assisted by its own compressive force when expanded within the recesses as described.

In Fig. 7 I have shown a modified form of locking dog B' similar to that shown in Fig. 1 and Figs. 3 to 6 inclusive save that instead of being made of a solid sheet of metal, each enlarged end is perforated as shown at $b^3$, and save that it may be made flat instead of dished or concavo-convex. With this form of locking dog the enlarged heads may be expanded into the recesses of the margin members A by any suitable rotary expanding tool applied to the expanding holes $b^3$. Locking dogs of this sort may be removed in the manner already described, or they may be picked out by any suitable pointed instrument inserted underneath them through the expanding holes $b^3$.

Referring now to the construction shown in Figs. 8 and 9, the margin members A, A and the panel piece C may be as already described. Instead of the form of locking recesses illustrated in the other figures, the locking recesses herein shown consist of the apertures $d$ which open through the abutting joint-making faces $a$, as in the forms heretofore described, and are provided with the offset parts $d'$, which form the shoulders $d^2$. The locking dog $B^2$ conforms with the shape of the juxtaposed apertures $d$ and is provided with the projections $b^4$ which engage the shoulders $d^2$ and lock the members A, A firmly together. The locking recesses $d$ may pass completely through the webs of the margin pieces A, instead of being countersunk as shown in Figs. 1 and 3, and the locking dogs $B^2$ may be made of the same thickness as the perforated webs of the margin pieces A. The dog $B^2$ is expanded into the recesses $d$ by punching or swaging and thus compressively engages the recesses, the end projections $b^4$ engaging also the retaining shoulders $d^2$, thus securely fastening the two members A, A, together.

I claim:

1. A joint construction comprising two members having abutting joint-making faces, each member provided with a locking recess having an enlarged inner part and a constricted throat part opening through the joint-making face, the throat parts of said recesses registering with each other when the members are juxtaposed, and a locking dog consisting of a concavo-convex sheet of soft metal having enlarged end parts and a constricted middle part conforming in contour with said juxtaposed recesses, adapted to be expanded within said recesses by flattening.

2. A joint construction comprising two members having abutting joint-making faces, each member provided with a locking recess having an enlarged inner part and a constricted throat part opening through the joint-making face, the throat parts of said recesses registering with each other when the members are juxtaposed, and a locking dog consisting of a concavo-convex sheet of soft metal having enlarged end parts and a constricted middle part conforming in contour with said juxtaposed recesses, and having its margin notched or slitted, adapted to be expanded within said recesses by flattening.

3. A joint construction comprising two members having abutting joint-making faces, each member provided with a recess countersunk in one of its exposed faces, said countersunk recesses having enlarged curvilinear inner parts and constricted throat parts opening through said joint-making faces, the said throat parts registering with each other when the two members are juxtaposed, and said recesses undercut to provide an overhanging lip, and a locking dog consisting of a concavo-convex sheet of soft metal having enlarged curvilinear end parts and a constricted middle part conforming in contour with said juxtaposed recesses, and having a beveled edge to engage the overhanging lips of said recesses, said dog adapted to be expanded within said recesses by flattening.

4. A joint construction comprising two members having abutting joint-making faces, each member provided with a locking recess countersunk in one of its exposed faces and undercut to provide an overhanging lip, said locking recesses opening through the joint-making faces and also through said exposed faces, and a locking dog engaging said recesses adapted to be inserted therein by being passed through the openings in the exposed faces of the members, fitting under said retaining lips and held thereby within said recesses.

5. In a joint construction, in combination, two members having abutting joint-making faces, each member provided with a locking recess opening both through the joint-making face and through the exposed face, and a locking dog conforming in contour with said recesses, made of soft metal, and adapted to be passed through the openings in the exposed faces of said members and to be expanded therein.

6. In a joint construction, in combination, two members having abutting joint-making faces, each member provided with a locking recess opening both through the joint-making face and through the exposed face, the openings through the exposed faces being provided with overhanging lips, and a locking dog conforming in contour with said recesses, made of soft metal, and adapted to be passed through the openings in the exposed faces of said members and to be expanded therein under said overhanging lips.

Signed by me at Boston, Massachusetts, this thirty-first day of August 1909.

DAVID E. HUNTER.

Witnesses:
ROBERT CUSHMAN,
JOSEPHINE H. RYAN.